US012515744B2

(12) United States Patent
Jo et al.

(10) Patent No.: US 12,515,744 B2
(45) Date of Patent: Jan. 6, 2026

(54) WHEEL BASE AND METHOD FOR ADJUSTING LENGTH THEREOF

(71) Applicants: Hyundai Motor Company, Seoul (KR); Kia Corporation, Seoul (KR); MOBINN Inc., Suwon-si (KR)

(72) Inventors: Sun Myoung Jo, Ansan-si (KR); Jin Choi, Seoul (KR); Hoon Chung, Hwaseong-si (KR)

(73) Assignees: HYUNDAI MOTOR COMPANY, Seoul (KR); KIA CORPORATION, Suwon-si (KR); MOBINN INC., Suwon-si (KR)

( * ) Notice: Subject to any disclaimer, the term of this patent is extended or adjusted under 35 U.S.C. 154(b) by 474 days.

(21) Appl. No.: 18/309,140

(22) Filed: Apr. 28, 2023

(65) Prior Publication Data

US 2024/0208574 A1    Jun. 27, 2024

(30) Foreign Application Priority Data

Dec. 22, 2022    (KR) .......................... 10-2022-0182124

(51) Int. Cl.
*B62D 21/14*    (2006.01)
*G05B 23/02*    (2006.01)

(52) U.S. Cl.
CPC ......... *B62D 21/14* (2013.01); *G05B 23/0259* (2013.01)

(58) Field of Classification Search
CPC ............................ B62D 21/14; G05B 23/0259
See application file for complete search history.

(56) References Cited

U.S. PATENT DOCUMENTS

| | | | |
|---|---|---|---|
| 6,840,347 B2 | 1/2005 | Nakatsu et al. | |
| 8,540,272 B1* | 9/2013 | Vitale | B62D 47/003 280/638 |
| 9,199,671 B1* | 12/2015 | Ahn | B62D 21/14 |
| 10,343,740 B2 | 7/2019 | Kama et al. | |
| 11,505,004 B2 | 11/2022 | Jo et al. | |
| 11,767,060 B2* | 9/2023 | Hammond, Jr. | B62D 21/11 180/311 |
| 12,030,579 B2* | 7/2024 | An | B62J 1/08 |

(Continued)

FOREIGN PATENT DOCUMENTS

| | | |
|---|---|---|
| CN | 1485235 A | 3/2004 |
| CN | 1270931 C | 8/2006 |

(Continued)

*Primary Examiner* — Brian L Swenson
(74) *Attorney, Agent, or Firm* — Slater Matsil, LLP (57) ABSTRACT

An embodiment wheel base includes a first base including a first wheel, a second base including a second wheel and coupled to the first base, a locking unit including a driving part and a fixing part operated by the driving part and selectively coupled to a plurality of fixing reception parts in the second base for coupling between the first and second bases, and a processor electrically connected to the locking unit, wherein, in response to receiving a base length adjustment command, the processor initializes a position value of the driving part acquired by a position value acquisition part, drives the driving part to achieve an unlocked state, and in response to an absolute value of the position value of the driving part acquired after the driving part is driven being less than or equal to a first reference position value, determines that an unlocking failure has occurred.

20 Claims, 9 Drawing Sheets

(56) References Cited

U.S. PATENT DOCUMENTS

| | | |
|---|---|---|
| 12,221,159 B2 * | 2/2025 | Cai .......................... B60K 1/04 |
| 12,240,532 B2 * | 3/2025 | Formoza .............. B62D 31/006 |
| 2004/0070189 A1 | 4/2004 | Nakatsu et al. |
| 2013/0240274 A1 * | 9/2013 | Vitale .................. B62D 63/025 |
| | | 180/65.1 |
| 2014/0202780 A1 * | 7/2014 | Lark, Jr. ................ B62D 21/14 |
| | | 280/149.2 |
| 2018/0072366 A1 | 3/2018 | Kama et al. |
| 2020/0276865 A1 | 9/2020 | Jo et al. |
| 2022/0234662 A1 | 7/2022 | Hwang et al. |
| 2022/0388339 A1 | 12/2022 | Jo et al. |
| 2024/0034117 A1 * | 2/2024 | Panigrahi ................ B60P 1/006 |
| 2024/0109615 A1 * | 4/2024 | Lutz .................... B62D 53/067 |

FOREIGN PATENT DOCUMENTS

| | | |
|---|---|---|
| CN | 107813891 A | 3/2018 |
| CN | 212022191 U | 11/2020 |
| JP | 2004123083 A | 4/2004 |
| JP | 2011031638 A | 2/2011 |
| JP | 2012006430 A | 1/2012 |
| JP | 2013226899 A | 11/2013 |
| JP | 2018043607 A | 3/2018 |
| KR | 20200105131 A | 9/2020 |
| KR | 20220163785 A | 12/2022 |
| KR | 20230147402 A | 10/2023 |
| WO | 2022119255 A1 | 6/2022 |

\* cited by examiner

WHEEL BASE AND METHOD FOR ADJUSTING LENGTH THEREOF

CROSS-REFERENCE TO RELATED APPLICATIONS

This application claims the benefit of Korean Patent Application No. 10-2022-0182124, filed on Dec. 22, 2022, which application is hereby incorporated herein by reference.

TECHNICAL FIELD

Exemplary embodiments relate to a wheel base and a method for adjusting a length thereof.

BACKGROUND

Autonomous mobile robots have to be able to overcome various terrains, such as stairs and bumps, as well as simple flat surfaces. For an autonomous mobile robot using wheels rather than a humanoid robot, it is difficult to overcome various terrains simply by adjusting outputs of the wheels. In particular, when the cross-sectional area occupied by the robot is small, the robot can be widely used, but is disadvantageous in overcoming rough terrains.

Therefore, for the autonomous mobile robot using wheels, a method of adjusting distances between the wheels is widely used to overcome various terrains. A wheel base, to which wheels are coupled, is divided into two parts, which are normally locked without relative movement to each other. However, when it is necessary to adjust a distance between the wheels, the two parts may be unlocked from each other, and the distance therebetween may be adjusted by the movement relative to each other. The locked state is made again after the distance is adjusted, and stable driving becomes possible.

However, the relative movement between the two parts of the wheel base is not always performed according to an ideal scenario, and an operation of locking and unlocking each part does not always lead to ideal results. Depending on environments, the operation of the robot may be hindered, and thus, locking or unlocking may not be performed properly, or the two parts of the wheel base may not have sufficient movement relative to each other.

SUMMARY

Exemplary embodiments of the present invention provide a wheel base, of which a length may be stably adjusted by identifying a situation in which length adjustment of the wheel base has failed, and a method for adjusting the length thereof.

A first exemplary embodiment of the present invention provides a wheel base including a first base including a first wheel, a second base including a second wheel and coupled to the first base, a locking unit which includes a driving part provided to generate a driving force and coupled to the first base and a fixing part operated by the driving part and selectively coupled to a plurality of fixing reception parts provided in the second base to thereby mediate coupling between the first base and the second base, and a processor electrically connected to the locking unit, wherein when receiving a base length adjustment command, the processor initializes a position value of the driving part acquired by a position value acquisition part installed in the driving part, drives the driving part to achieve an unlocked state in which the fixing part coupled to a first fixing reception part among the plurality of fixing reception parts is separated from the first fixing reception part, and determines that unlocking failure has occurred when an absolute value of the position value of the driving part acquired after the driving part is driven to achieve the unlocked state is less than or equal to a first reference position value.

A second exemplary embodiment of the present invention provides a method for adjusting a length of a wheel base which includes a first base including a first wheel, a second base including a second wheel and coupled to the first base, and a locking unit selectively coupled to a plurality of fixing reception parts provided in the second base to thereby mediate coupling between the first base and the second base, the method including an operation of receiving a base length adjustment command, initializing a position value of the locking unit, a first unlocking operation of separating the locking unit, which is coupled to a first fixing reception part among the plurality of fixing reception parts, from the first fixing reception part, and an operation of determining that unlocking failure has occurred, when an absolute value of the position value of the locking unit acquired after the first unlocking operation is less than or equal to a first reference position value.

BRIEF DESCRIPTION OF THE DRAWINGS

The accompanying drawings, which are included to provide a further understanding of embodiments of the invention and are incorporated in and constitute a part of this specification, illustrate exemplary embodiments of the invention, and together with the description serve to explain the principles of the invention.

DETAILED DESCRIPTION OF ILLUSTRATIVE EMBODIMENTS

Hereinafter, exemplary embodiments of the present disclosure will be described in more detail with reference to the accompanying drawings. When reference numerals are given to elements in each drawing, it should be noted that the same elements will be designated by the same reference numerals if possible although they are shown in different drawings. Also, in describing exemplary embodiments of the present disclosure, a detailed description of related known configurations or functions will be omitted when it is determined that the understanding of the exemplary embodiments of the present disclosure is hindered by the detailed description.

In describing components of exemplary embodiments of the present disclosure, terms such as first, second, A, B, (a), and (b) may be used. These terms are only used to distinguish one component from other components, and the characteristics, orders, or sequences of the corresponding components are not limited by the terms. When one component is described as being "connected," "coupled," or "linked" to another component, this component may be directly connected or linked to another component, but it should be understood that other components may be "connected", "coupled," or "linked" between these components.

Figure 1:
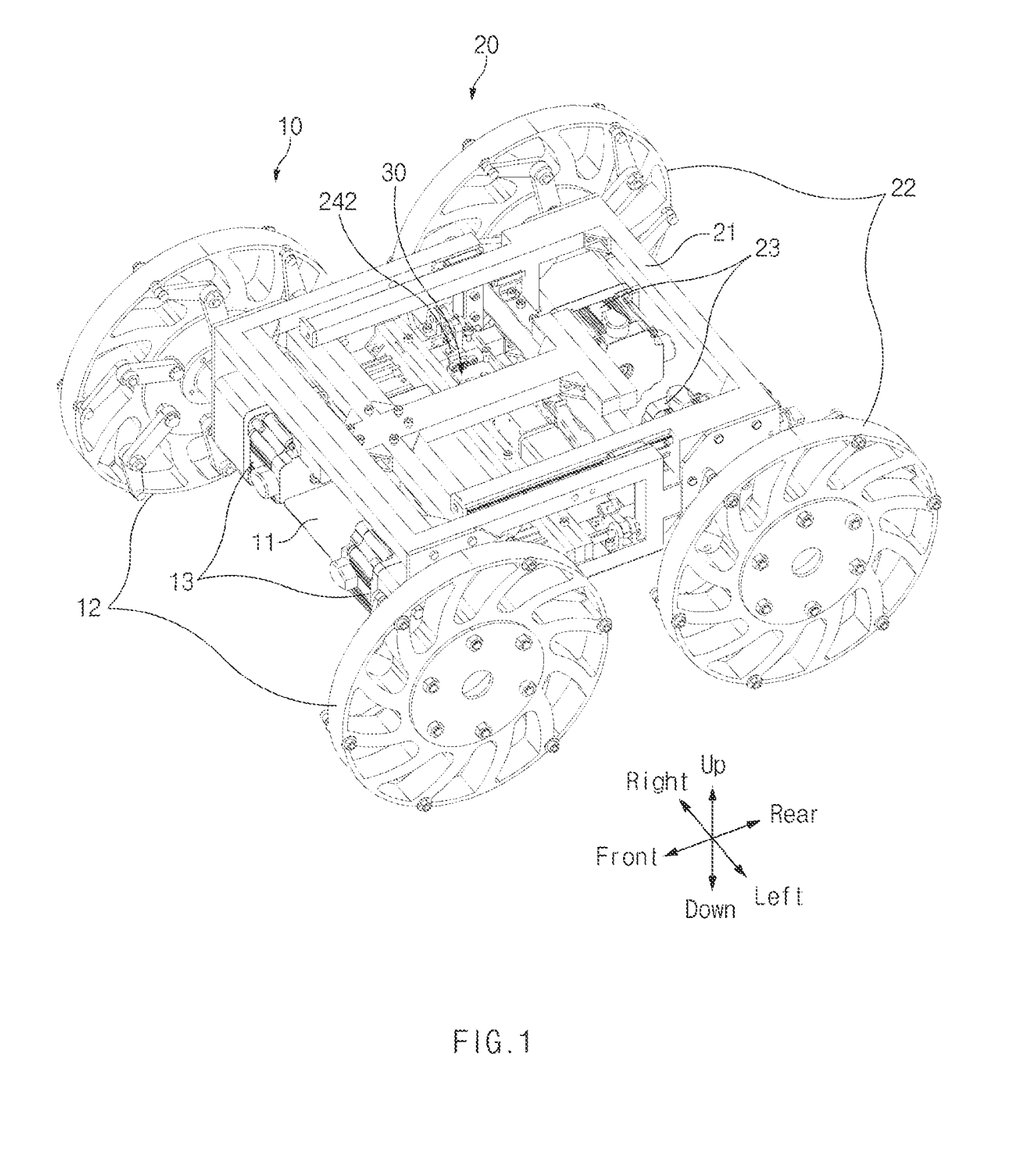
FIG. 1 is a perspective view illustrating a state in which a wheel base according to an exemplary embodiment of the present disclosure is in a shortening mode.
Figure 2:
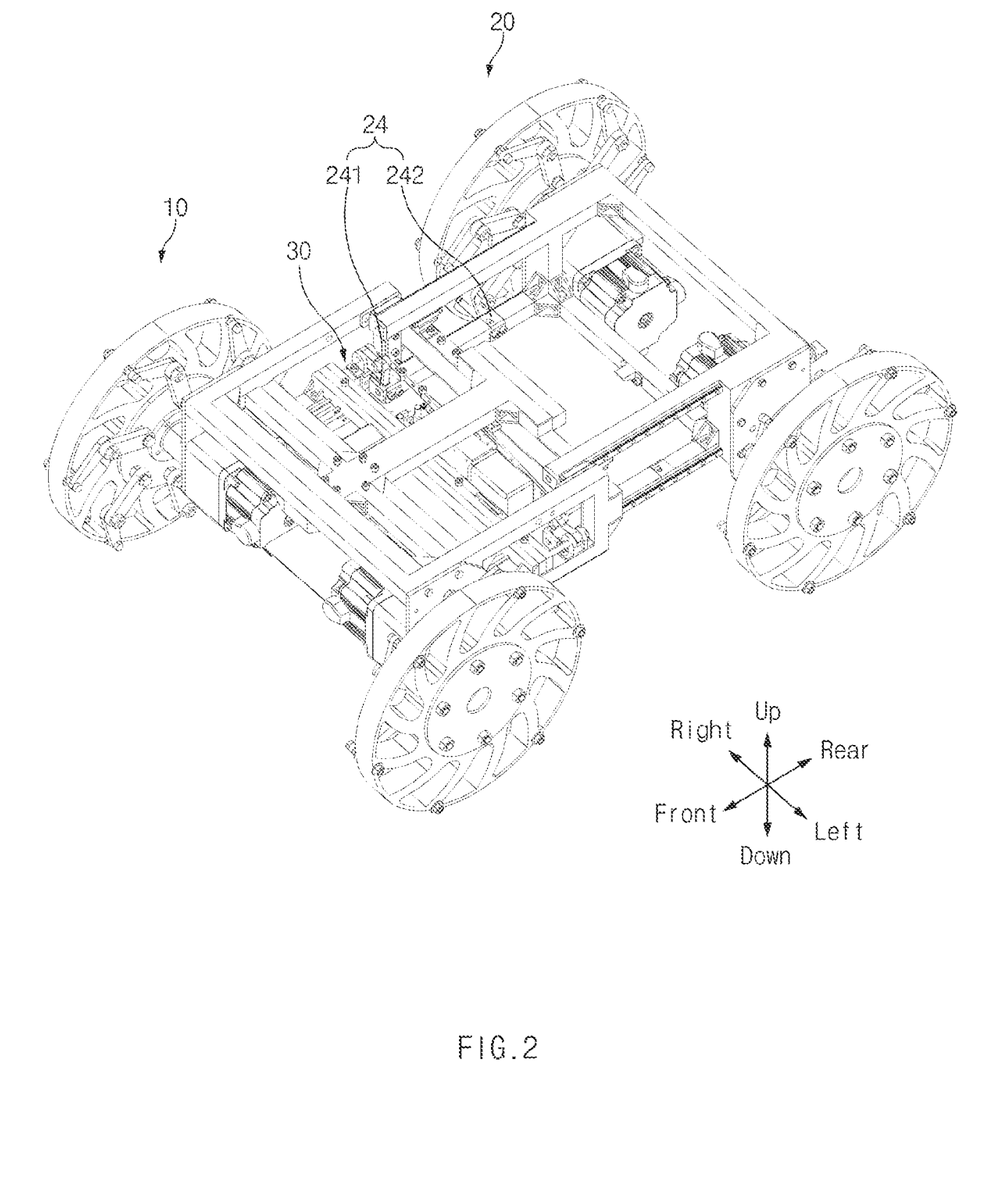
FIG. 2 is a perspective view illustrating a state in which a wheel base according to an exemplary embodiment of the present disclosure is in an extending mode.

FIG. 1 is a perspective view illustrating a state in which a wheel base according to an exemplary embodiment of the present disclosure is in a shortening mode. FIG. 2 is a perspective view illustrating a state in which a wheel base according to an exemplary embodiment of the present disclosure is in an extending mode.

Referring to the drawings, a wheel base according to an exemplary embodiment of the present disclosure may include a first base 10, a second base 20, and a locking unit 30. The first base 10 is located on a relatively front side, and the second base 20 is located on a relatively rear side. The first base 10 and the second base 20 have relative movement, and thus, the length of the wheel base in the front-rear direction may be adjusted. The length of the wheel base in the shortening mode of FIG. 1 is less than the length of the wheel base in the extending mode of FIG. 2.

As used herein, the front, rear, left, right, up, and down directions are referred to for convenience of description, and these directions may be determined relative to the directions in which the wheel base is located. The front-rear direction, left-right direction, and up-down direction may be perpendicular to each other.

First Base 10 and Second Base 20

Figure 3:
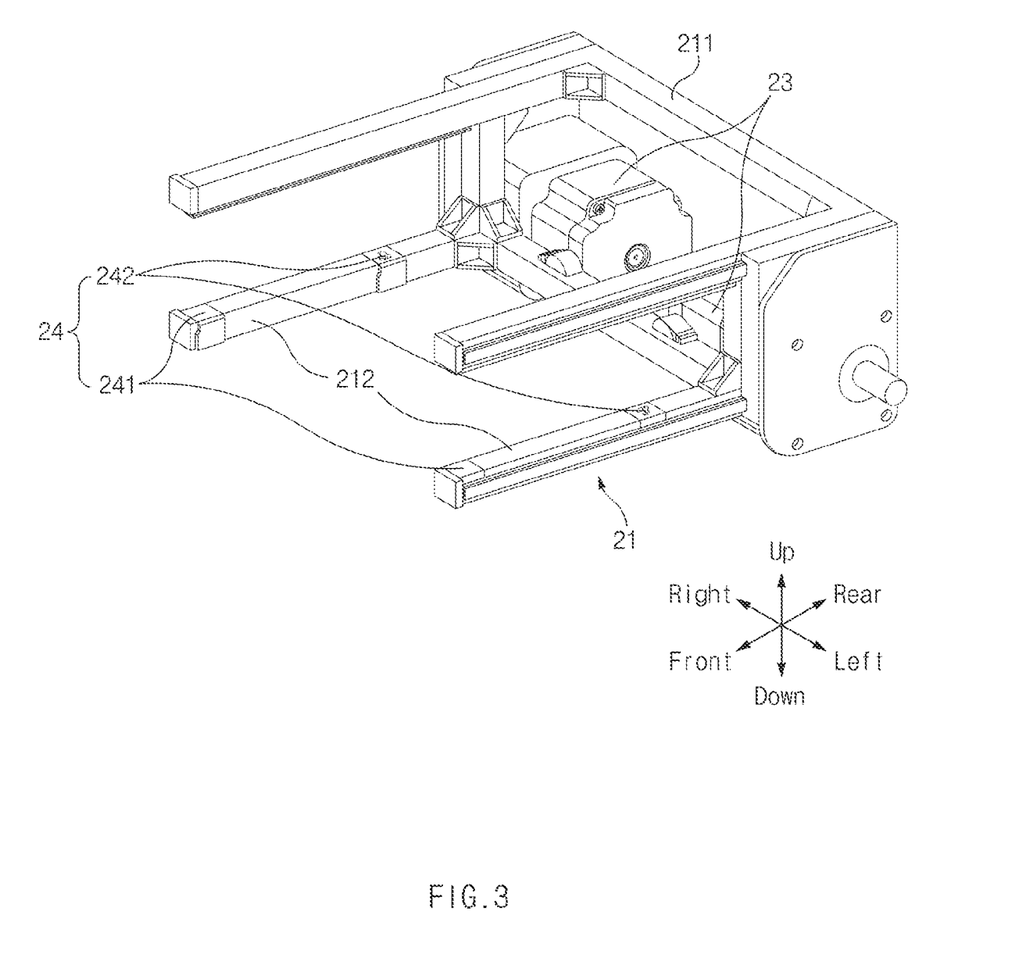
FIG. 3 is a perspective view illustrating a second base according to an exemplary embodiment of the present disclosure.
Figure 4:
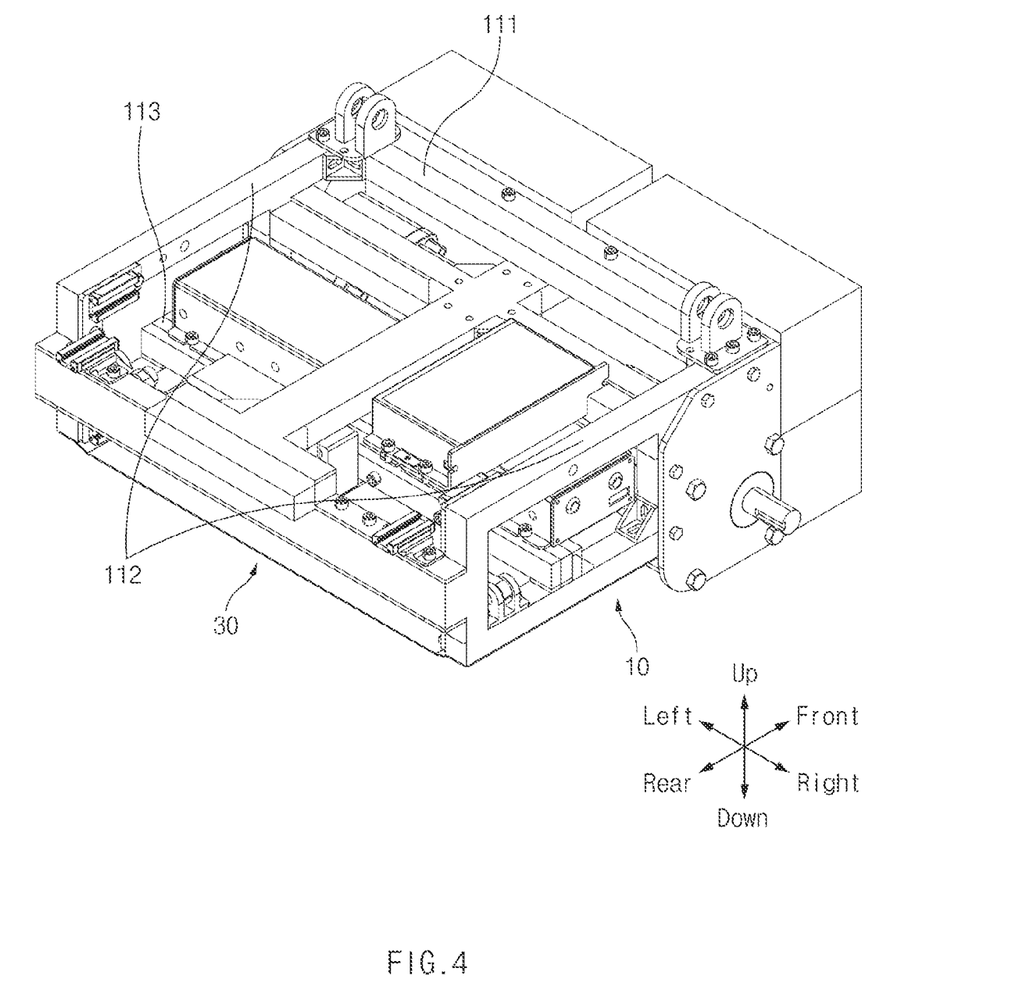
FIG. 4 is a perspective view illustrating a first base according to an exemplary embodiment of the present disclosure.

FIG. 3 is a perspective view illustrating the second base 20 according to an exemplary embodiment of the present disclosure. FIG. 4 is a perspective view illustrating the first base 10 according to an exemplary embodiment of the present disclosure.

The first base 10 includes a first wheel 12. The first wheel 12 includes a wheel that may rotate and travel. The first base 10 includes a first frame 11. The first wheel 12 may be rotatably coupled to the first frame 11. The first wheel 12 may rotate about an axis parallel to the left-right direction as an axial direction. A pair of first wheels 12 may be provided and respectively located on the left and right sides of the first frame 11.

The first base 10 may include a first motor 13. The first motor 13 is coupled to the first frame 11 and connected to the first wheels 12 to transmit the generated driving force to the first wheels 12 so that the first wheels 12 can rotate. A pair of first motors 13 may be provided and respectively coupled to the pair of first wheels 12. The first motor 13 may receive power and generate driving force.

The first frame 11 may include a first left-right frame 111 extending in the left-right direction. The first frame 11 may include a first front-rear frame 112 extending rearward from the first left-right frame 111. Two first left-right frames 111 may be provided and spaced apart from each other in the up-down direction. The first motor 13 may be coupled to the first left-right frame 111. A plurality of first front-rear frames 112 may be provided and spaced apart from each other in the left-right direction and the up-down direction.

The first frame 11 may include a first middle frame 113. The first middle frame 113 extends in the left-right direction and may be spaced rearward from the first left-right frame 111. The locking unit 30 may be coupled to the first middle frame 113.

The second base 20 includes a second wheel 22. The second wheel 22 includes a wheel that may rotate and travel. The second base 20 includes a second frame 21. The second wheel 22 may be rotatably coupled to the second frame 21. The second wheel 22 may rotate about an axis parallel to the left-right direction as an axial direction. A pair of second wheels 22 may be provided and respectively located on the left and right sides of the second frame 21.

The second base 20 may include a second motor 23. The second motor 23 is coupled to the second frame 21 and connected to the second wheels 22 to transmit the generated driving force to the second wheels 22 so that the second wheels 22 can rotate. A pair of second motors 23 may be provided and respectively coupled to the pair of second wheels 22. The second motor 23 may receive power and generate driving force.

The second frame 21 may include a second left-right frame 211 extending in the left-right direction. The second frame 21 may include a second front-rear frame 212 extending forward from the second left-right frame 211. Two second left-right frames 211 may be provided and spaced apart from each other in the up-down direction. The second motor 23 may be coupled to the second left-right frame 211. Four second front-rear frames 212 may be provided and spaced apart from each other in the left-right direction and the up-down direction.

A width of the second left-right frame 211 in the left-right direction may be less than or equal to a width between the outermost two first front-rear frames 112 which are spaced apart from each other in the left-right direction. Accordingly, the second frame 21 may enter forward between the first front-rear frames 112.

A plurality of fixing reception parts 24, which may be coupled to the locking unit 30, are provided on the second front-rear frames 212. The fixing reception parts 24 may be arranged in the second front-rear frames 212 which are located on a lower side among the plurality of second front-rear frames 212. An extending-fixing reception part 241 may be located in a region adjacent to each of front ends of the second front-rear frames 212. A shortening-fixing reception part 242 may be located at a position spaced rearward from the extending-fixing reception part 241. Each of the fixing reception parts 24 may include a fixing hole provided in the form of a hole as illustrated in the drawing, but the shapes of the fixing reception part are not limited thereto.

When the wheel base is in the extending mode, the locking unit 30 is coupled to the extending-fixing reception parts 241. When the wheel base is in the shortening mode, the locking unit 30 is coupled to the shortening-fixing reception parts 242. In a state in which the locking unit 30 is not coupled to the fixing reception parts 24, at least one of the first wheel 12 or the second wheel 22 is driven, and a distance between the first wheel 12 and the second wheel 22 may be adjusted in the front-rear direction.

Locking Unit 30

Figure 5:
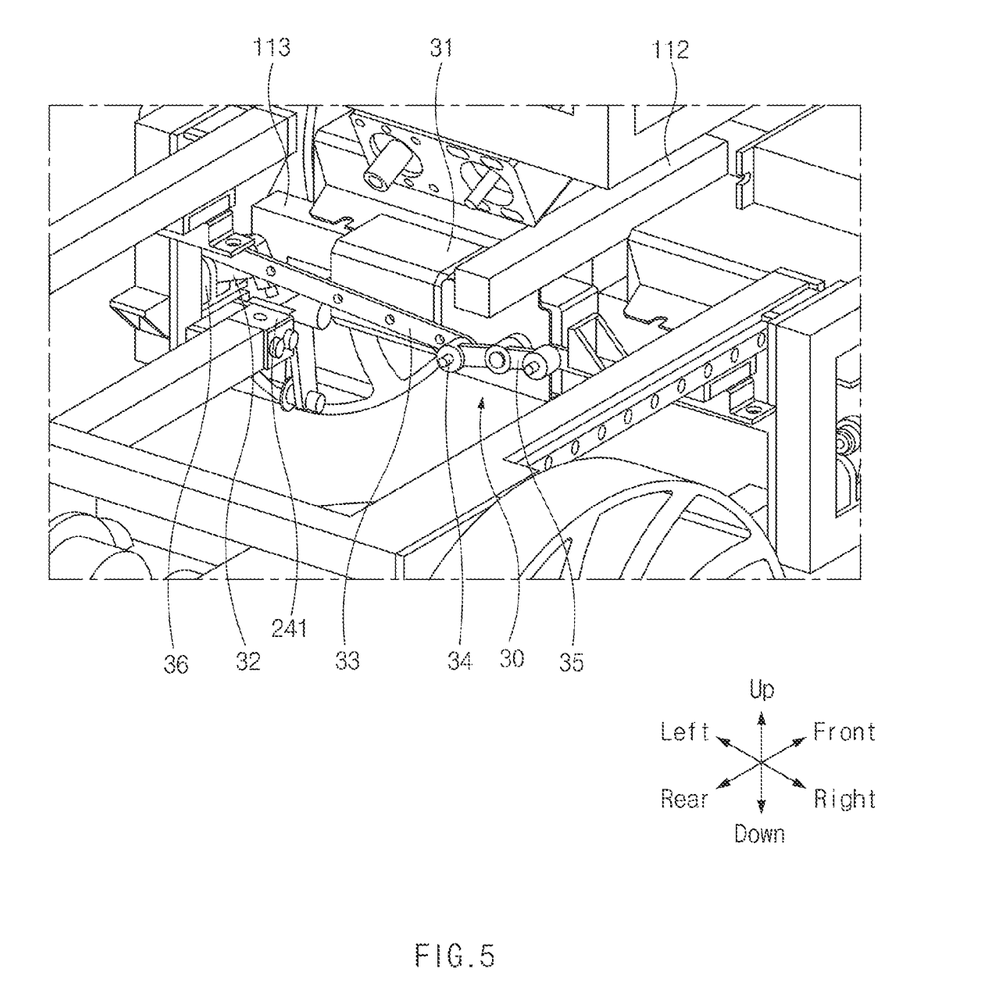
FIG. 5 is a perspective view illustrating a locking unit and the surroundings thereof according to an exemplary embodiment of the present disclosure.
Figure 6:
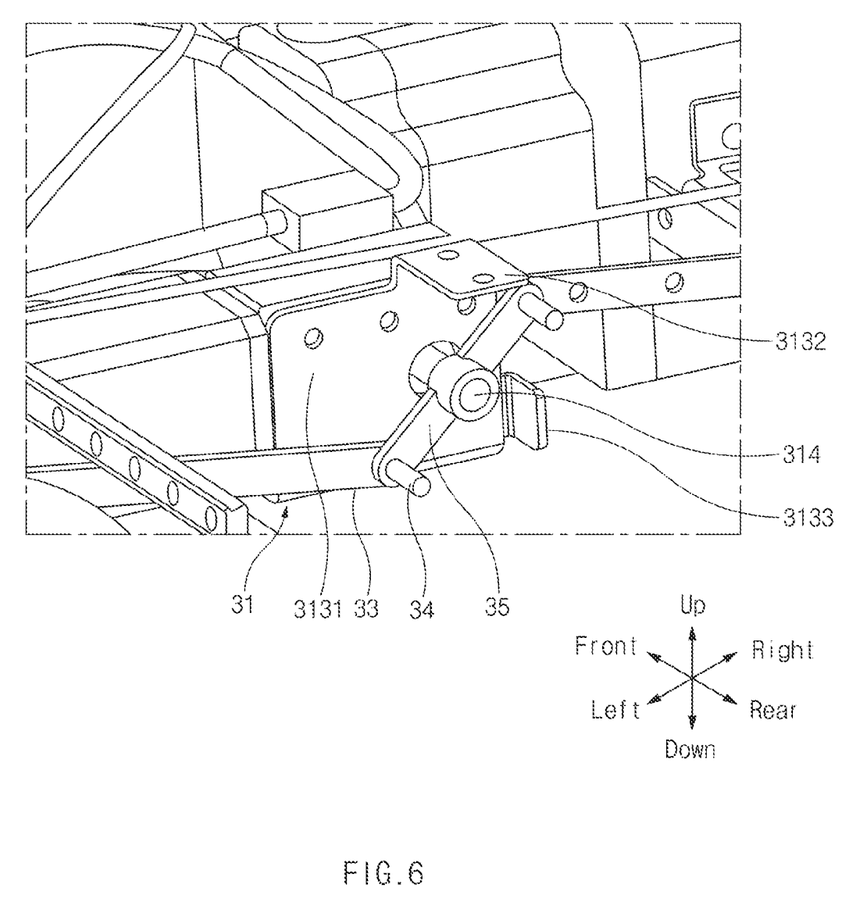
FIG. 6 is a perspective view illustrating a central portion of a locking unit and the surroundings thereof according to an exemplary embodiment of the present disclosure.
Figure 7:
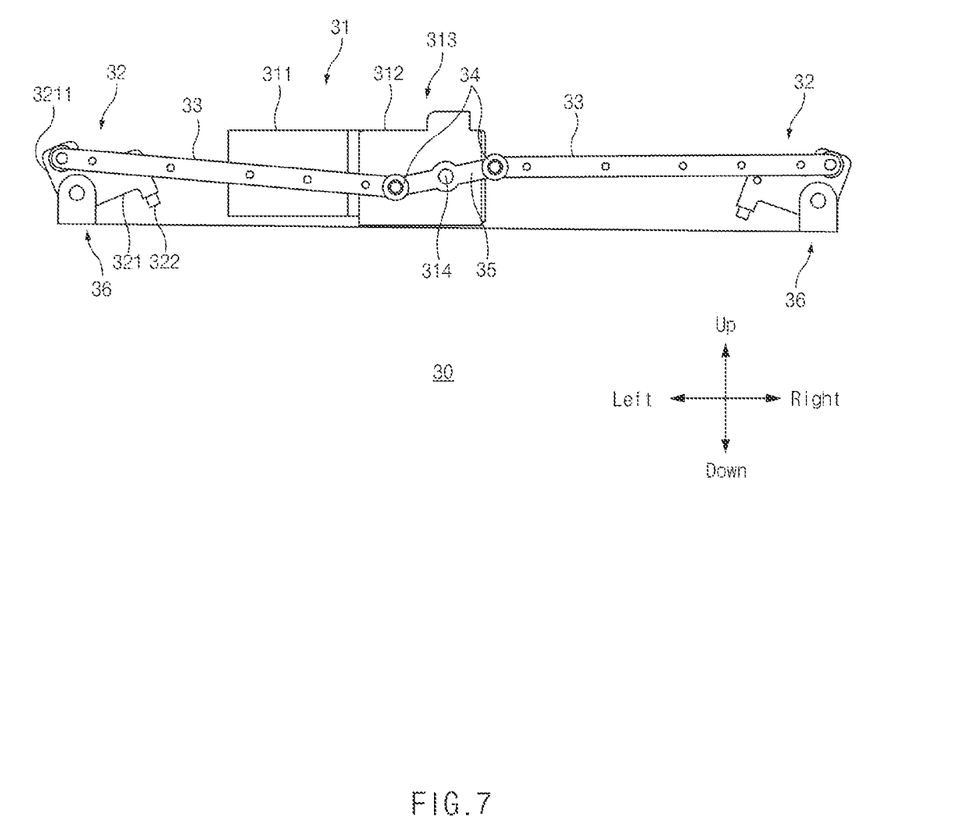
FIG. 7 is a view illustrating a state in which a locking unit according to an exemplary embodiment of the present disclosure is in an unlocked state.
Figure 8:
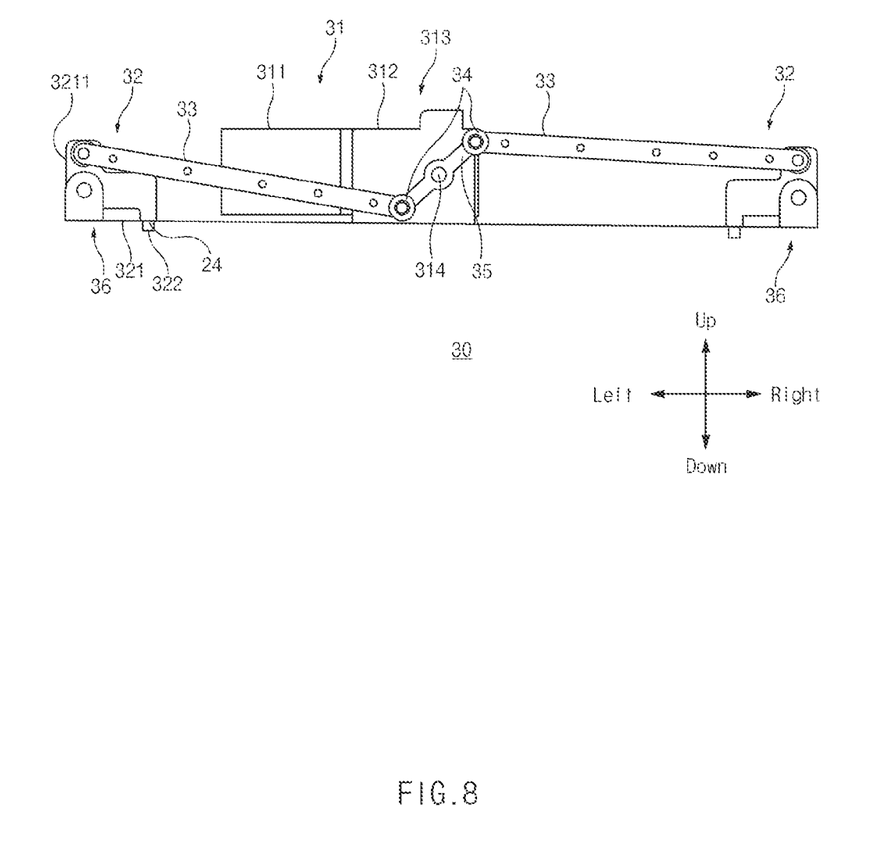
FIG. 8 is a view illustrating a state in which a locking unit according to an exemplary embodiment of the present disclosure is in a locked state.

FIG. 5 is a perspective view illustrating the locking unit 30 and the surroundings thereof according to an exemplary embodiment of the present disclosure. FIG. 6 is a perspective view illustrating a central portion of the locking unit 30 and the surroundings thereof according to an exemplary embodiment of the present disclosure. FIG. 7 is a view illustrating a state in which the locking unit 30 according to an exemplary embodiment of the present disclosure is in an unlocked state. FIG. 8 is a view illustrating a state in which the locking unit 30 according to an exemplary embodiment of the present disclosure is in a locked state.

The locking unit 30 is selectively coupled to the fixing reception parts 24 and mediates the coupling between the first base 10 and the second base 20. When the locking unit 30 is coupled to the fixing reception parts 24, the relative positions between the first base 10 and the second base 20 are fixed. Also, when the locking unit 30 is separated from the fixing reception parts 24, the first base 10 and the second base 20 may have relative movements.

The locking unit 30 may include a driving part 31 and a fixing part 32. The driving part 31 is provided to generate a driving force and may be coupled to the first frame 11 of the first base 10. The driving part 31 may include a motor or an actuator to generate rotational driving force. An exemplary embodiment of the present disclosure is described as including a motor, but a means utilized to generate a driving force is not limited thereto.

The driving part 31 may include a driving motor 311. The driving force is generated by the driving motor 311. The driving part 31 may include a driving gear part 312. The driving gear part 312 includes at least one gear and is connected to the driving motor 311 to convert the magnitude or direction of the driving force generated by the driving motor 311 into an appropriate magnitude or direction for use.

A position value acquisition part may be installed in the driving part 31. The position value acquisition part is a device for acquiring how much the driving motor 311 has been driven (that is, the amount of rotation of the driving motor 311) and may include at least one of an encoder or a photo sensor, but the type thereof is not limited thereto. A value obtained by the position value acquisition part may be expressed as a position value of the driving part 31 or a position value of the locking unit 30.

The driving part 31 may include a driving bracket 313. The driving bracket 313 may include a bracket body 3131 and a first stopper 3132 and a second stopper 3133 protruding from the bracket body 3131. The bracket body 3131 may be formed in a plate shape perpendicular to the front-rear direction. The bracket body 3131 may be coupled to the driving gear part 312. The bracket body 3131 has a hole, and a driving output shaft 314 receiving the output of the driving gear part 312 may pass through the hole.

The first stopper 3132 may protrude rearward from the upper end of the bracket body 3131. The second stopper 3133 may protrude rearward from the right end of the bracket body 3131. The first stopper 3132 and the second stopper 3133 may limit the rotation range of an output link 35 that is coupled to the driving output shaft 314 rotating about an axis in the front-rear direction. In FIG. 6, the clockwise rotation of the output link 35 to achieve an unlocked state may be limited by the second stopper 3133, and the counterclockwise rotation of the output link 35 to achieve a locked state may be limited by the first stopper 3132. Therefore, the movable range of the fixing part 32 of the locking unit 30 may be determined by the first stopper 3132 and the second stopper 3133.

The locking unit 30 may include an output link 35 and an extension link 33. The output link 35 is coupled to the driving output shaft 314 and rotated about an axis in the front-rear direction by the rotational force transmitted from the driving part 31. One end of the extension link 33 is rotatably coupled to the output link 35 by a link hinge pin 34, and the other end of the extension link 33 is rotatably coupled to the fixing part 32. Accordingly, the fixing part 32 may be rotated by the extension link 33 according to the rotation of the output link 35. A pair of extension links 33 may be provided and respectively coupled to both ends of the output link 35. The driving part 31 and the output link 35 may be arranged in a central region in the left-right direction, and the extension links 33 may extend outward from the output link 35.

The fixing part 32 may be operated by the driving part 31 and selectively coupled to the fixing reception parts 24. A pair of fixing parts 32 are provided and may be rotatably coupled to the pair of extension links 33, respectively. The fixing parts 32 may be arranged outside the driving part 31 in the left-right direction. The fixing parts 32 may be arranged adjacent to the fixing reception parts 24. The fixing part 32 may include a fixing body 321. An upper end portion 3211 of the fixing body 321, which is a region adjacent to the upper end of the fixing body 321, may be rotatably coupled to the extension link 33. The fixing part 32 may include a coupling portion 322. The coupling portion 322 may be located at the lower end of the fixing body 321 and coupled to a fixing reception part 24. The coupling portion 322 may have a shape protruding downward from the fixing body 321 as illustrated in the drawing, but the shape of the coupling portion is not limited thereto. The fixing reception part 24 may have a protruding shape, and the coupling portion 322 may have a recessed shape corresponding to the shape of the fixing reception part 24.

The locking unit 30 may include a fixing shaft part 36. The fixing shaft part 36 may be coupled to the first frame 11. The fixing shaft part 36 is rotatably coupled to a portion of the fixing body 321 other than the upper end portion 3211 of the fixing body 321. Therefore, when pulled inward or pushed outward in the left-right direction by the extension link 33, the fixing part 32 may be rotated about the fixing shaft part 36 in the front-rear direction. As the fixing part 32 rotates about the fixing shaft part 36, the coupling portion 322 may be coupled to the fixing reception part 24 or separated from the fixing reception part 24.

Processor

Figure 9:
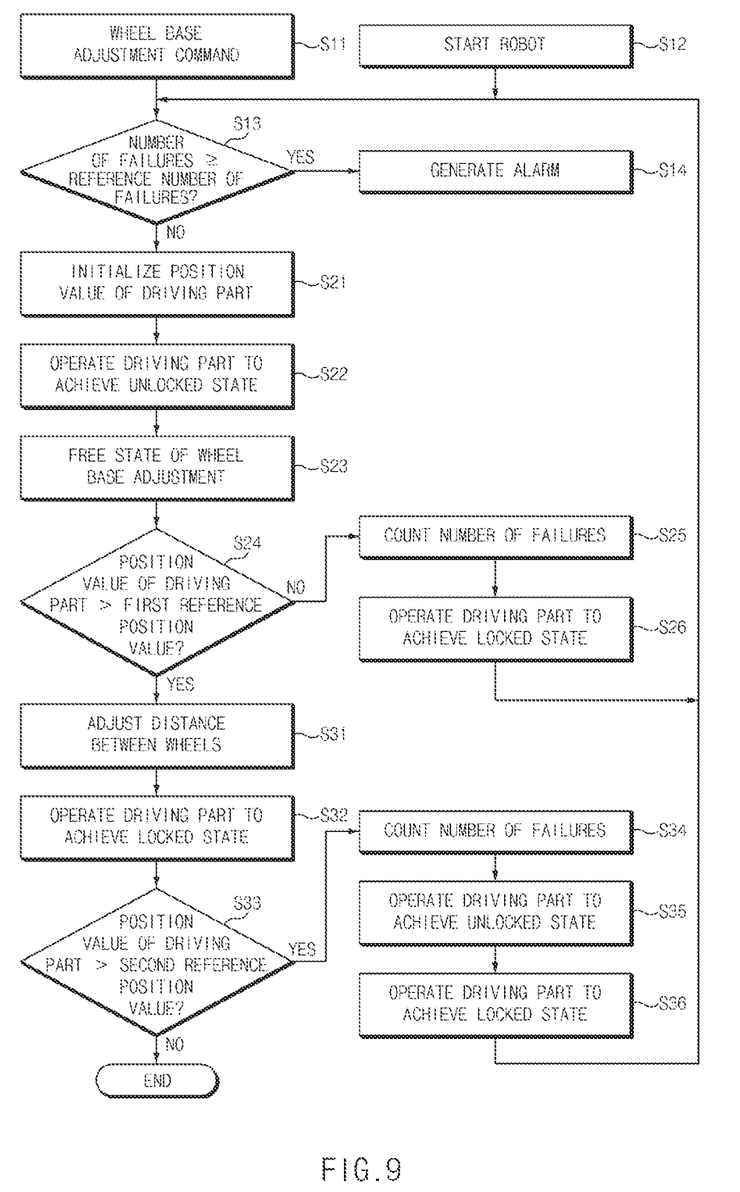
FIG. 9 is a flowchart showing a method for adjusting a length of a wheel base according to an exemplary embodiment of the present disclosure.

FIG. 9 is a flowchart showing a method for adjusting a length of a wheel base according to an exemplary embodiment of the present disclosure.

A processor may be electrically connected to the locking unit 30. The processor may be electrically connected to other components, for example, the first motor 13 and the second motor 23. The processor may be coupled and fixed to the first frame 11, but may also be located on the second frame 21.

A processor is provided to control the wheel base. The processor may include a central processing unit (CPU) and the like as components including elements capable of logic operations for performing control commands. The processor may be connected to various components and transmit a signal according to a control command to each of the components to control the components, and may be connected to various sensors or acquisition units and receive acquired information in the form of a signal. Accordingly, in an exemplary embodiment of the present disclosure, the processor may be electrically connected to various components included in the wheel base. The processor may be electrically connected to each of the components. Therefore, the processor may communicate with the components by being connected to the components via wires or by including a communication module capable of wireless communication.

The wheel base according to an exemplary embodiment of the present disclosure further includes a storage medium, and thus, control commands executed by the processor may be stored in the storage medium and utilized. The storage medium may include devices such as a hard disk drive (HDD), a solid state drive (SSD), a server, a volatile medium, and a nonvolatile medium, but the types of the storage medium are not limited thereto. Data required for the processor to perform tasks may be further stored in the storage medium.

Hereinafter, a wheel base length-adjusting method using the components of the wheel base described above is described.

The processor may receive a base length adjustment command (S11) after power is turned on to a robot using the wheel base (S12). The base length adjustment command may be transmitted from a user or may be made by the processor's own determination. Before receiving the length adjustment command, the wheel base may be in a locked state in which the locking unit 30 is coupled to a first fixing reception part. The first fixing reception part is one of an extending-fixing reception part 241 and a shortening-fixing reception part 242, and a second fixing reception part is the other one.

When receiving the base length adjustment command, the processor checks the counted number of failures and generates an alarm when the number of failures is greater than or equal to a reference number of failures (S14), before initializing a position value of a driving part 31 (S13) which is described below. However, the number of failures may be initialized to zero immediately after receiving the base length adjustment command. When returning after performing subsequent operations during processes described below, the number of failures is counted and may be equal to or greater than the reference number of failures. When the number of failures is less than the reference number of failures, the processor performs an operation of initializing the position value of the driving part 31.

The processor initializes the stored position value of the driving part 31 (S21). The processor drives the driving part 31 to achieve an unlocked state in which a fixing part 32 coupled to the first fixing reception part is separated from the first fixing reception part (S22). The operation of separating the fixing part 32, which has been coupled to the first fixing reception part, from the first fixing reception part as described above may be referred to as a first unlocking operation. An output link 35 touches a first stopper 3132, and thus, driving of the driving part 31 may be stopped. Since the fixing part 32 is separated from the fixing reception part 24, the first base 10 and the second base 20 may freely move relative to each other (S23).

The processor compares an absolute value of the position value of the driving part 31 acquired after the driving part 31 is driven to achieve the unlocked state with a first reference position value (S24). The processor determines that unlocking failure has occurred when the absolute value of the position value of the driving part 31 acquired after the driving part 31 is driven to achieve the unlocked state is less than or equal to the first reference position value.

There are many reasons for the unlocking failure. The driving part 31 may not rotate sufficiently due to an unknown external force, or the fixing part 32 may not be properly coupled to the fixing reception part at the time of initializing the position of the driving part 31.

When determining that the unlocking failure has occurred, the processor may perform an unlocking failure-counting operation of counting the number of failures (S25). In the unlocking failure-counting operation, the processor may determine that the current operation has entered a failure mode.

When the unlocking failure occurs, the processor may perform a first locking operation of driving the driving part 31 to achieve a locked state in which the fixing part 32 is coupled to the first fixing reception part (S26). Subsequently, the processor may perform a first return operation of returning to operation S21 of initializing the position value. When operation S13 of determining the number of failures exists, the first return operation may return to operation S13 of determining the number of failures.

In operation S24 of comparing the absolute value of the position value of the driving part 31 obtained after the driving part 31 is driven to achieve the unlocked state with the first reference position value, when the absolute value of the position value of the driving part 31 is greater than the first reference position value, the processor may operate at least one of the first wheel 12 or the second wheel 22 to adjust the distance between the first wheel 12 and the second wheel 22, thereby adjusting the length of the wheel base (S31). Since the length of the wheel base is adjusted, the distance between the first wheel 12 and the second wheel 22 is adjusted. The direction in which the length of the wheel base is adjusted may include a direction in which the length of the wheel base is increased or a direction in which the length of the wheel base is decreased. This depends on whether the fixing reception part is the extending-fixing reception part 241 or the shortening-fixing reception part 242. When the first fixing reception part is the extending-fixing reception part 241, the length of the wheel base is adjusted to be decreased. When the first fixing reception part is the shortening-fixing reception part 242, the length of the wheel base is adjusted to be increased.

After the length of the wheel base is adjusted, the processor perform a second locking operation of driving the driving part 31 to achieve a locked state in which the fixing part 32 is coupled to the second fixing reception part (S32). This operation is necessary so that the first base 10 and the second base 20 may be fixed to each other again and travel stably.

The processor may compare an absolute value of the position value of the driving part 31 acquired after the driving part 31 is driven to achieve the locked state with a second reference position value (S33). The processor may determine that the locking failure has occurred when the absolute value of the position value of the driving part 31 is greater than the second reference position value.

There are many reasons for the locking failure. The driving part 31 may not rotate sufficiently due to an unknown external force, or the second fixing reception part and the fixing part 32 are not correctly aligned with each other and thus do not meet properly.

When determining that the locking failure has occurred, the processor may perform a locking failure-counting operation of counting the number of failures (S34). In the locking failure-counting operation, the processor may determine that the current operation has entered a failure mode.

When determining that the locking failure has occurred, the processor may perform a second unlocking operation of driving the driving part 31 to achieve an unlocked state in which the fixing part 32 is separated from the second fixing reception part (S35). Subsequently, the processor may perform a re-locking operation of driving the driving part 31 to achieve a locked state in which the fixing part 32 is coupled again to the second fixing reception part (S36). Subsequently, the processor may perform a second return operation of returning to operation S21 of initializing the position value. When operation S13 of determining the number of failures exists, the second return operation may return to operation S13 of determining the number of failures. When the locking failure has occurred, the locking failure may be caused by problems in the unlocked state as well as during the locking operation. Therefore, before adjusting the length of the wheel base, it is necessary to go back to the initial state by performing unlocking and check the operations again from the beginning.

Another Exemplary Embodiment

Another exemplary embodiment of the present disclosure is different from the exemplary embodiment of the present disclosure with respect only to operations after the second unlocking operation. Therefore, for the configuration of the wheel base and the other operations of the method for adjusting the length of the wheel base, the contents of the exemplary embodiment of the present disclosure may be applied to the another exemplary embodiment of the present disclosure.

In another exemplary embodiment of the present disclosure, the processor may check whether the number of failures is greater than or equal to a reference number of failures after the second unlocking operation and generate an alarm when the number of failures is greater than or equal to the reference number of failures. Subsequently, the processor may perform a third return operation of returning to the second locking operation.

Accordingly, the situation in which the length adjustment of the wheel base has failed may be identified, and thus, the length of the wheel base may be stably adjusted.

Even though all of the components constituting exemplary embodiments of the present disclosure have been described as being combined as one body or operating in combination, the present disclosure is not necessarily limited to the exemplary embodiments. That is, within the scope of the present disclosure, all of the components may be selectively combined into one or more and then operated. Also, terms such as "include," "constitute," or "have" described above may mean that the corresponding components may be included unless explicitly described to the contrary, and thus should be construed as further including other components rather than excluding other components. Unless otherwise defined, all terms including technical or scientific terms have the same meanings as those generally understood by a person skilled in the art to which the present disclosure pertains. Terms used generally such as terms defined in dictionaries should be interpreted as having the same meaning as in an associated technical context, and should not be understood abnormally or as having an excessively formal meaning unless defined apparently in the present disclosure.

The technical ideas of embodiments of the present disclosure have been described merely for illustrative purposes, and those skilled in the art will appreciate that various changes and modifications are possible without departing from the essential features of the present disclosure. Thus, the embodiments of the present disclosure are to be considered illustrative and not restrictive, and the technical idea of the present disclosure is not limited to the foregoing embodiments. The protective scope of the present disclosure is defined by the appended claims, and all technical ideas within their equivalents should be interpreted as being included in the scope of the present disclosure.

What is claimed is:

1. A wheel base comprising:
a first base comprising a first wheel;
a second base comprising a second wheel and coupled to the first base;
a locking unit comprising:
 a driving part configured to generate a driving force and coupled to the first base; and
 a fixing part configured to be operated by the driving part and selectively coupled to a plurality of fixing reception parts provided in the second base to mediate coupling between the first base and the second base; and
a processor electrically connected to the locking unit, wherein, in response to receiving a base length adjustment command, the processor is configured to:
 initialize a position value of the driving part acquired by a position value acquisition part installed in the driving part;
 drive the driving part to achieve an unlocked state in which the fixing part coupled to a first fixing reception part among the plurality of fixing reception parts is separated from the first fixing reception part; and
 in response to an absolute value of the position value of the driving part acquired after the driving part is driven to achieve the unlocked state being less than or equal to a first reference position value, determine that an unlocking failure has occurred.

2. The wheel base of claim 1, wherein in determining that the unlocking failure has occurred, the processor is configured to:
drive the driving part to achieve a locked state in which the fixing part is coupled to the first fixing reception part; and
return to a state of initializing the position value of the driving part.

3. The wheel base of claim 2, wherein in determining that the unlocking failure has occurred, the processor is configured to count the number of failures.

4. The wheel base of claim 3, wherein before initializing the position value of the driving part, the processor is configured to check the number of failures and generate an alarm in response to the number of failures being greater than or equal to a reference number of failures.

5. The wheel base of claim 1, wherein in response to the absolute value of the position value of the driving part acquired after the driving part is driven to achieve the unlocked state being greater than the first reference position value, the processor is configured to:
operate the first wheel or the second wheel to adjust a distance between the first wheel and the second wheel; and
drive the driving part to achieve a locked state in which the fixing part is coupled to a second fixing reception part different from the first fixing reception part among the plurality of fixing reception parts.

6. The wheel base of claim 5, wherein, in response to the absolute value of the position value of the driving part acquired after the driving part is driven to achieve the locked state being greater than a second reference position value, the processor is configured to determine that a locking failure has occurred.

7. The wheel base of claim 6, wherein in determining that the locking failure has occurred, the processor is configured to:
drive the driving part so that the fixing part is in the unlocked state;
drive the driving part so that the fixing part is in the locked state; and
return to a state of initializing the position value of the driving part.

8. The wheel base of claim 7, wherein in determining that the locking failure has occurred, the processor is configured to count the number of failures.

9. The wheel base of claim 8, wherein before initializing the position value of the driving part, the processor is configured to check the number of failures and generate an alarm in response to the number of failures being greater than or equal to a reference number of failures.

10. The wheel base of claim 6, wherein in determining that the locking failure has occurred, the processor is configured to:
count the number of failures;
drive the driving part so that the fixing part is in the unlocked state;
drive the driving part so that the fixing part is in the locked state;
acquire the position value of the driving part;
in response to the absolute value of the acquired position value of the driving part being greater than the second reference position value, determine that the locking failure has occurred; and
check the number of failures and generate an alarm in response to the number of failures being greater than or equal to a reference number of failures.

11. A method for adjusting a length of a wheel base, wherein the wheel base comprises a first base comprising a first wheel, a second base comprising a second wheel and coupled to the first base, and a locking unit selectively coupled to a plurality of fixing reception parts provided in the second base to mediate coupling between the first base and the second base, the method comprising:
receiving a base length adjustment command;
initializing a position value of the locking unit;
performing a first unlocking operation of separating the locking unit which is coupled to a first fixing reception part among the plurality of fixing reception parts from the first fixing reception part; and
in response to an absolute value of the position value of the locking unit acquired after the first unlocking operation being less than or equal to a first reference position value, determining that an unlocking failure has occurred.

12. The method of claim 11, wherein in determining that the unlocking failure has occurred, the method further comprises:
performing a first locking operation of coupling the locking unit to the first fixing reception part; and
performing a first return operation of returning to a state of initializing the position value.

13. The method of claim 12, further comprising performing an unlocking failure-counting operation of counting the number of failures after determining that the unlocking failure has occurred.

14. The method of claim 13, wherein before initializing the position value and in response to the number of failures being greater than or equal to a reference number of failures, the method further comprises generating an alarm.

15. The method of claim 11, wherein in response to the absolute value of the position value of the locking unit acquired after the first unlocking operation being greater than the first reference position value, the method further comprises:
operating the first wheel or the second wheel to adjust a distance between the first wheel and the second wheel; and
performing a second locking operation of coupling the locking unit to a second fixing reception part different from the first fixing reception part among the plurality of fixing reception parts.

16. The method of claim 15, further comprising, in response to the absolute value of the position value of the locking unit acquired after the second locking operation being greater than or equal to a second reference position value, determining that a locking failure has occurred.

17. The method of claim 16, wherein after determining that the locking failure has occurred, the method further comprises:
performing a second unlocking operation of separating the locking unit from the second fixing reception part;
performing a re-locking operation of coupling the locking unit to the second fixing reception part; and
performing a second return operation of returning to a state of initializing the position value.

18. The method of claim 17, further comprising, after determining that the locking failure has occurred, performing a locking failure-counting operation of counting the number of failures.

19. The method of claim 18, wherein before initializing the position value and in response to the number of failures being greater than or equal to a reference number of failures, the method further comprises generating an alarm.

20. The method of claim 16, wherein after determining that the locking failure has occurred, the method further comprises:
counting the number of failures;
separating the locking unit from the second fixing reception part;
in response to the number of failures being greater than or equal to a reference number of failures, generating an alarm; and
performing a third return operation of returning to the second locking operation.

* * * * *